(12) United States Patent
Hoyte et al.

(10) Patent No.: US 7,676,285 B2
(45) Date of Patent: Mar. 9, 2010

(54) METHOD FOR MONITORING DRIVEN MACHINERY

(75) Inventors: Scott Mordin Hoyte, Carson City, NV (US); Stephen Robert Schmid, Carson City, NV (US); Eric Gebhardt, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 755 days.

(21) Appl. No.: 10/829,529

(22) Filed: Apr. 22, 2004

(65) Prior Publication Data

US 2005/0240289 A1    Oct. 27, 2005

(51) Int. Cl.
G05B 13/02    (2006.01)

(52) U.S. Cl. .......................................... 700/52; 700/49

(58) Field of Classification Search .................. 700/28, 700/29, 31, 18, 23, 37, 49, 26, 52, 53, 86, 700/42; 702/183–184; 714/37, 38, 46, 47
See application file for complete search history.

(56) References Cited

U.S. PATENT DOCUMENTS

| | | | |
|---|---|---|---|
| 5,311,562 A | 5/1994 | Palusamy et al. | |
| 5,905,989 A | 5/1999 | Biggs | |
| 5,943,634 A | 8/1999 | Piety et al. | |
| 6,026,348 A | 2/2000 | Hala | |
| 6,092,029 A | 7/2000 | Bently | |
| 6,172,428 B1 * | 1/2001 | Jordan ....................... 290/40 C |
| 6,230,062 B1 | 5/2001 | Shah | |
| 6,298,454 B1 * | 10/2001 | Schleiss et al. ............... 714/37 |
| 6,405,139 B1 * | 6/2002 | Kicinski et al. .............. 702/33 |
| 6,421,571 B1 | 7/2002 | Spriggs et al. | |
| 6,445,962 B1 * | 9/2002 | Blevins et al. ............... 700/37 |
| 6,507,804 B1 | 1/2003 | Hala et al. | |
| 6,510,353 B1 * | 1/2003 | Gudaz et al. ................. 700/37 |
| 6,615,090 B1 | 9/2003 | Blevins et al. | |
| 6,633,782 B1 | 10/2003 | Schleiss et al. | |
| 6,721,609 B1 * | 4/2004 | Wojsznis et al. ............. 700/28 |
| 6,728,594 B1 * | 4/2004 | Kiernan et al. ............. 700/173 |
| 2003/0163288 A1 * | 8/2003 | Follin et al. ................. 702/188 |
| 2004/0215355 A1 * | 10/2004 | Mills et al. ................... 700/28 |
| 2006/0259163 A1 * | 11/2006 | Hsiung et al. ................ 700/30 |

FOREIGN PATENT DOCUMENTS

EP    1 049 050 A    11/2000

OTHER PUBLICATIONS

European Search Report, EP 05 25 2449 (Apr. 4, 2006).

* cited by examiner

*Primary Examiner*—Ryan A Jarrett
(74) *Attorney, Agent, or Firm*—Armstrong Teasdale LLP

(57) ABSTRACT

A method and system for operating a facility having a plurality of equipment combinations wherein each equipment combination is operating interactively with at least one of another of the plurality of equipment combination is provided. The method includes receiving, in real-time, for each of the plurality of equipment combinations, a plurality of measured process parameters, determining at least one derived quantity from the plurality of measured process parameters, and recommending a change to an equipment operation based on the measured process parameters and the derived quantities.

8 Claims, 5 Drawing Sheets

METHOD FOR MONITORING DRIVEN MACHINERY

BACKGROUND OF THE INVENTION

This invention relates generally to the monitoring of machinery, and more particularly to methods and systems for continuously monitoring a plurality of machines.

At least some known machinery monitoring systems, monitor machine drivers, for example, motors and turbines, or machine driven components, such as, pumps, compressors, and fans. Other known monitoring systems monitor process parameters of a process, for example, piping systems, and machine environmental conditions, such as machine vibration, machine temperature, and machine oil condition. Typically, such monitoring systems are supplied by an original equipment manufacture (OEM) that is responsible for only a portion of a facility, for example, a specific piece of equipment, and as such, the OEM may only provide monitoring for equipment provided by that OEM. However, industrial facilities such as power plants, refineries, factories, and commercial facilities, such as, hospitals, high-rise buildings, resorts, and amusement parks may utilize a considerable plurality of machine drivers and driven equipment dependently interconnected to form various process systems. An architect/engineer may integrate such equipment for an owner or operator of the facility. Monitoring systems supplied by different OEMs may communicate with external data collection and control systems, such as distributed control systems (DCS) located at sites that are remote from the monitored equipment, for example, control rooms and/or operating areas.

Typically, machine monitoring systems are primarily focused on providing operating indications and controls, and/or trending or datalogging capabilities for future reconstruction of abnormal events. Machine monitoring systems that provide useful maintenance related data, such as vibration data, limit data collection and analysis to discrete components isolated from other components that may be operated in an interconnected system. For example, monitoring systems may collect vibration data for a motor/pump combination but, analyze each machine separately, ignoring the interdependence between each individual machine. If the analysis does account for the combination acting as a connected combination, the known systems only consider the vibration parameters collected, and any further analysis of external causes or sources for the particular vibration characteristics of the motor/pump combination is done manually by a plant engineer performing troubleshooting or predictive maintenance activities. However, the motor/pump combination may be part of a larger process system wherein any number of process parameters from other motor/pump combinations and/or other equipment may contribute or affect the vibration characteristics of the motor/pump combination.

BRIEF DESCRIPTION OF THE INVENTION

In one aspect, a method and system for operating a facility having a plurality of equipment combinations wherein each equipment combination is operating interactively with at least one of another of the plurality of equipment combination is provided. The method includes receiving, in real-time, for each of the plurality of equipment combinations, a plurality of measured process parameters, determining at least one derived quantity from the plurality of measured process parameters, and recommending a change to an equipment operation based on the measured process parameters and the derived quantities.

In another aspect, an integrated monitoring and control system for a plant having a plurality of equipment combinations operating interactively with each other and with individual equipment wherein the equipment combinations are operated to maintain selected plant operational conditions is provided The integrated monitoring and control system includes a plurality of sensors operatively coupled to the equipment combinations, the plurality of sensors measuring process parameters for monitoring plant operation and assessing equipment combination condition, and providing output signals to said monitoring and control system, a derived quantity layer communicatively coupled to a data bus wherein the derived quantity layer is configured to receive the measured process parameters; and compute values for process parameters using the measured process parameters. The integrated monitoring and control system also includes a rule set layer comprising at least one rule associated with at least some of the plurality of equipment combinations for determining a health of the equipment combination, and a recommendation layer for correlating the health of the equipment combination to at least one of a mitigating procedure, a maintaining procedure, and an operation procedure.

In yet another aspect, a computer program embodied on a computer readable medium for monitoring a plant is provided. The plant includes a plurality of equipment combinations operating interactively with each other and with individual equipment. The program includes a code segment that controls a computer that receives a plurality of process parameters from sensors operatively coupled to the equipment combinations and individual equipment and then derives values for process parameters using the measured process parameters, selects a rule from a set of rules comprising a plurality of commands that direct data analysis for each at least one of measured process parameter, a derived quantity, a plurality of measured process parameters and a derived quantities associated with an equipment combination, and recommends at least one of a mitigating procedure, a maintaining procedure, and an operation procedure.

DETAILED DESCRIPTION OF THE INVENTION

Figure 1:
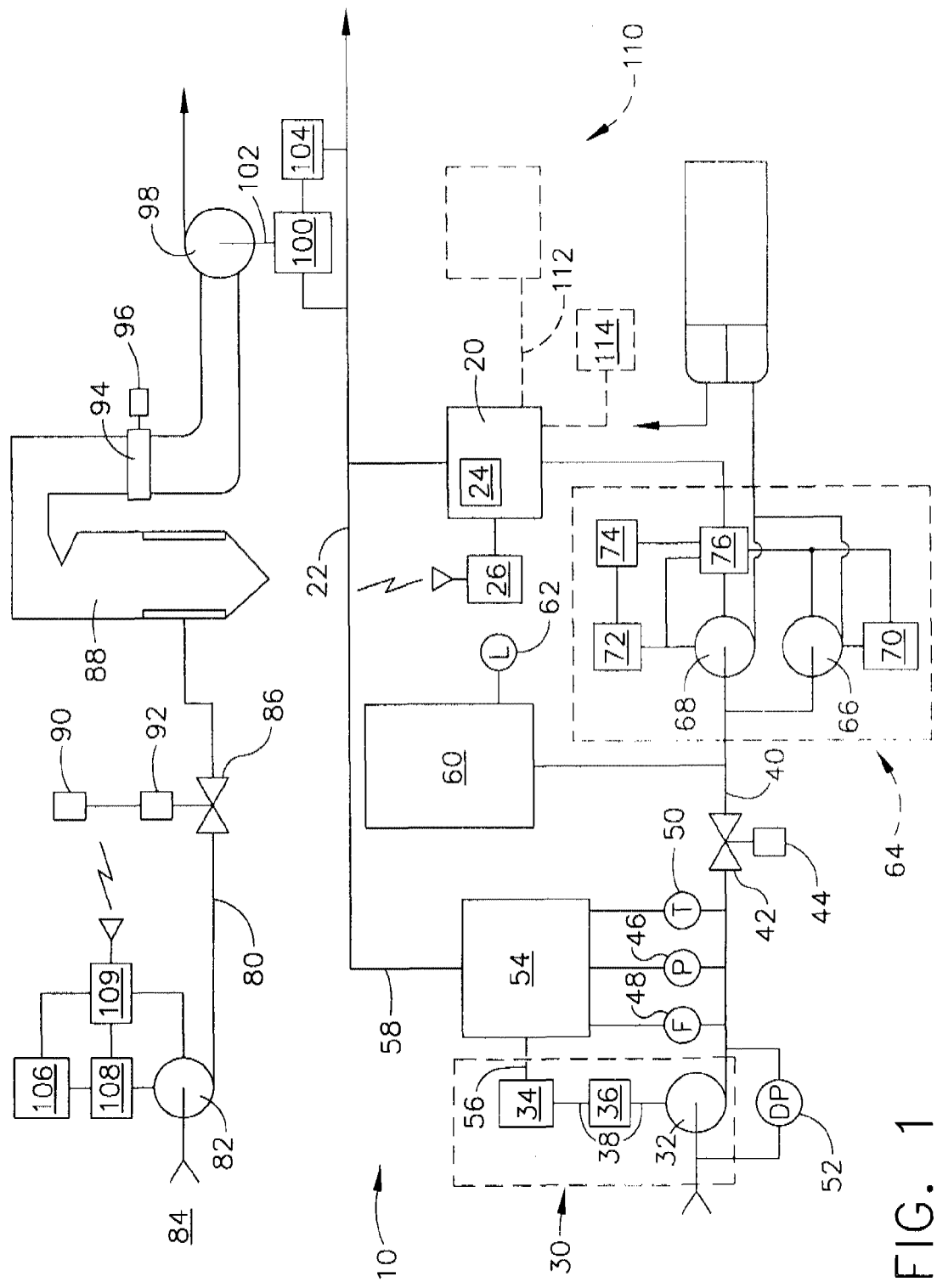
FIG. 1 is a block diagram an exemplary equipment layout of an industrial plant.

FIG. 1 is a block diagram an exemplary equipment layout of an industrial plant 10. Industrial plant 10 may include a plurality of pumps, motors, fans, and process monitoring sensors that are coupled in flow communication through interconnecting piping and coupled in signal communication with a control system through one or more remote input/output (I/O) modules and interconnecting cabling and/or wireless communication. In the exemplary embodiment, industrial plant 10 includes a distributed control system (DCS) 20 including a network backbone 22. Network backbone 22 may be a hardwired data communication path fabricated from twisted pair cable, shielded coaxial cable or fiber optic cable, for example, or may be at least partially wireless. DCS 20 may also include a processor 24 that is communicatively coupled to equipment that is located at industrial plant 10, or at remote locations, through network backbone 22. It is to be understood that any number of machines may be communicatively connected to the network backbone 22. A portion of the machines may be hardwired to network backbone 22, and another portion of the machines may be wirelessly coupled to backbone 22 via a base station 26 that is communicatively coupled to DCS 20. Wireless base station 26 may be used to expand the effective communication range of DCS 20, such as with equipment or sensors located remotely from industrial plant 10 but, still interconnected to one or more systems within industrial plant 10.

DCS 20 may be configured to receive and display operational parameters associated with a plurality of equipment, and to generate automatic control signals and receive manual control inputs for controlling the operation of the equipment of industrial plant 10. In the exemplary embodiment, DCS 20 may include a software code segment configured to control processor 24 to analyze data received at DSC 20 that allows for on-line monitoring and diagnosis of the industrial plant machines. Process parameter data may be collected from each machine, including pumps and motors, associated process sensors, and local environmental sensors, including for example, vibration, seismic, ambient temperature and ambient humidity sensors. The data may be pre-processed by a local diagnostic module or a remote input/output module, or may transmitted to DCS 20 in raw form.

Specifically, industrial plant 10 may include a first process system 30 that includes a pump 32 coupled to a motor 34 through a coupling 36, for example a hydraulic coupling, and interconnecting shafts 38. The combination of pump 32, motor 34, and coupling 36, although comprising separate components, may operate as a single system, such that conditions affecting the operation of one component of the combination may effect each of the other components of the combination. Accordingly, condition monitoring data collected from one component of the combination that indicates a failure of a portion of the component or an impending failure of the component may be sensed at the other components of the combination to confirm the failure of the component and/or facilitate determining a source or root cause of the failure.

Pump 32 may be connected to a piping system 40 through one or more valves 42. Valve 42 may include an actuator 44, for example, but, not limited to, an air operator, a motor operator, and a solenoid. Actuator 44 may be communicatively coupled to DCS 20 for remote actuation and position indication. In the exemplary embodiment, piping system 40 may include process parameter sensors, such as a pressure sensor 46, a flow sensor 48, a temperature sensor 50, and a differential pressure (DP) sensor 52. In an alternative embodiment, piping system 40 may include other sensors, such as turbidity, salinity, pH, specific gravity, and other sensors associated with a particular fluid being carried by piping system 40. Sensors 46, 48, 50 and 52 may be communicatively coupled to a field module 54, for example, a preprocessing module, or remote I/O rack.

Motor 34 may include one or more of a plurality of sensors (not shown) that are available to monitor the operating condition of electrodynamic machines. Such sensors may be communicatively coupled to field module 54 through an interconnecting conduit 56, for example, copper wire or cable, fiber cable, and wireless technology.

Field module 54 may communicate with DCS 20 through a network segment 58. The communications may be through any network protocol and may be representative of preprocessed data and or raw data. The data may be transmitted to processor 24 continuously in a real-time environment or to processor 24 intermittently based on an automatic arrangement or a request for data from processor 24. DCS 20 includes a real time clock in communication with network backbone 22, for time stamping process variables for time-based comparisons.

Piping system 40 may include other process components, such as a tank 60 that may include one or more of a plurality of sensors available for monitoring process parameters associated with tanks, such as, a tank level sensor 62. Tank 60 may provide a surge volume for fluid pumped by pump 32 and/or may provide suction pressure for downstream components, such as, skid 64. Skid 64 may be a pre-engineered and pre-packaged subsystem of components that may be supplied by an OEM. Skid 64 may include a first pump 66 and a second pump 68. In the exemplary embodiment, first pump is coupled to a motor that is directly coupled to a power source (not shown) through a circuit breaker (not shown) that may be controlled by DCS 20. Second pump 68 is coupled to a motor 72 that is coupled to the power source through a variable speed drive (VSD) 74 that controls a rotational speed of motor 72 in response to commands from a skid controller 76. Each of pumps 66 and 68, and motors 70 and 72, and VSD 74 may include one or more sensors associated with respective operating parameters of each type of equipment as described above in relation to pump/motor/coupling 32, 34, and 36 combination. Skid controller 76 receives signals from the sensors and may transmit the signals to DCS 20 without preprocessing or after processing the data in accordance with predetermined algorithms residing within skid controller 76. Skid controller 76 may also process the signals and generate control signals for one or more of pumps 66 and 68, and motors 70 and 72, and VSD 74 without transmitting data to DCS 20. Skid controller may also receive commands from DCS 20 to modify the operation of skid 64 in accordance therewith.

A second piping system 80 may include a fan 82 that receives air from an ambient space 84 and directs the air through a valve or damper 86 to a component, such as a furnace 88. Damper 86 may include position sensors 90 and 92 to detect an open and closed position of damper 86. Furnace 88 may include a damper 94 that may be operated by actuator 96, which may be, for example, a motor actuator, a fluid powered piston actuator, or other actuator, which may be controlled remotely by DCLS 20 through a signal transmitted through a conduit (not shown). A second fan 98 may take a suction on furnace 88 to remove combustion gases from furnace 88 and direct the combustion gases to a smoke stack or chimney (not shown) for discharge to ambient space 84. Fan 98 may be driven by a motor 100 through a shaft 102 coupled between fan 98 and motor 100. A rotational speed of motor 100 may be controlled by a VSD 104 that may be communicatively coupled to DCS 20 though network backbone 22. Fan 82 may be driven by an engine 106, such as an internal combustion engine, or a steam, water, wind, or gas turbine, or other driver, through a coupling 108, which may be hydraulic or other power conversion device. Each of the components may include various sensors and control mechanisms that may be communicatively coupled to DCS 20 through network backbone 22 or may communicate with DCS 20 through a wireless transmitter/receiver 109 to wireless base station 26.

DCS 20 may operate independently to control industrial plant 10, or may be communicatively coupled to one or more other control systems 110. Each control system may communicate with each other and DCS 20 through a network segment 112, or may communicate through a network topology, for example, a star (not shown).

A continuous integrated machinery monitoring system (CIMMS) 114 may be a separate add-on hardware device that communicates with DCS 20 and other control systems 110. CIMMS 114 may also be embodied in a software program segment executing on DCS 20 and/or one or more of the other control systems 110. Accordingly, CIMMS 114 may operate in a distributed manner, such that a portion of the software program segment executes on several processors concurrently. As such, CIMMS 114 may be fully integrated into the operation of DCS 20 and other control systems 110. CIMMS 114 analyzes data received by DCS 20 and the other control systems 110 determine a health the machines and/or a process employing the machines using a global view of the industrial plant 10. CIMMS 114 analyzes combinations of drivers and driven components, and process parameters associated with each combination to correlate machine health findings of one machine to machine health indications from other machines in the combination, and associated process or environmental data. CIMMS 114 uses direct measurements from various sensors available on each machine and derived quantities from all or a portion of all the sensors in industrial plant 10. CIMMS 114, using predetermined analysis rules, determines a failure or impending failure of one machine and automatically, in real-time correlates the data used to determine the failure or impending failure with equivalent data derived from the operating parameters of other components in the combination or from process parameters. CIMMS 114 also provides for performing trend analysis on the machine combinations and displaying data and/or trends in a variety of formats so as to afford a user of CIMMS 114 an ability to quickly interpret the health assessment and trend information provided by CIMMS 114.

Although various combinations of machines are generally illustrated as motor/pump, motor/fan, or engine/fan combinations, it should be understood these combinations are exemplary only, and CIMMS is configured to analyze any combination of driver/driven machines.

Figure 2:
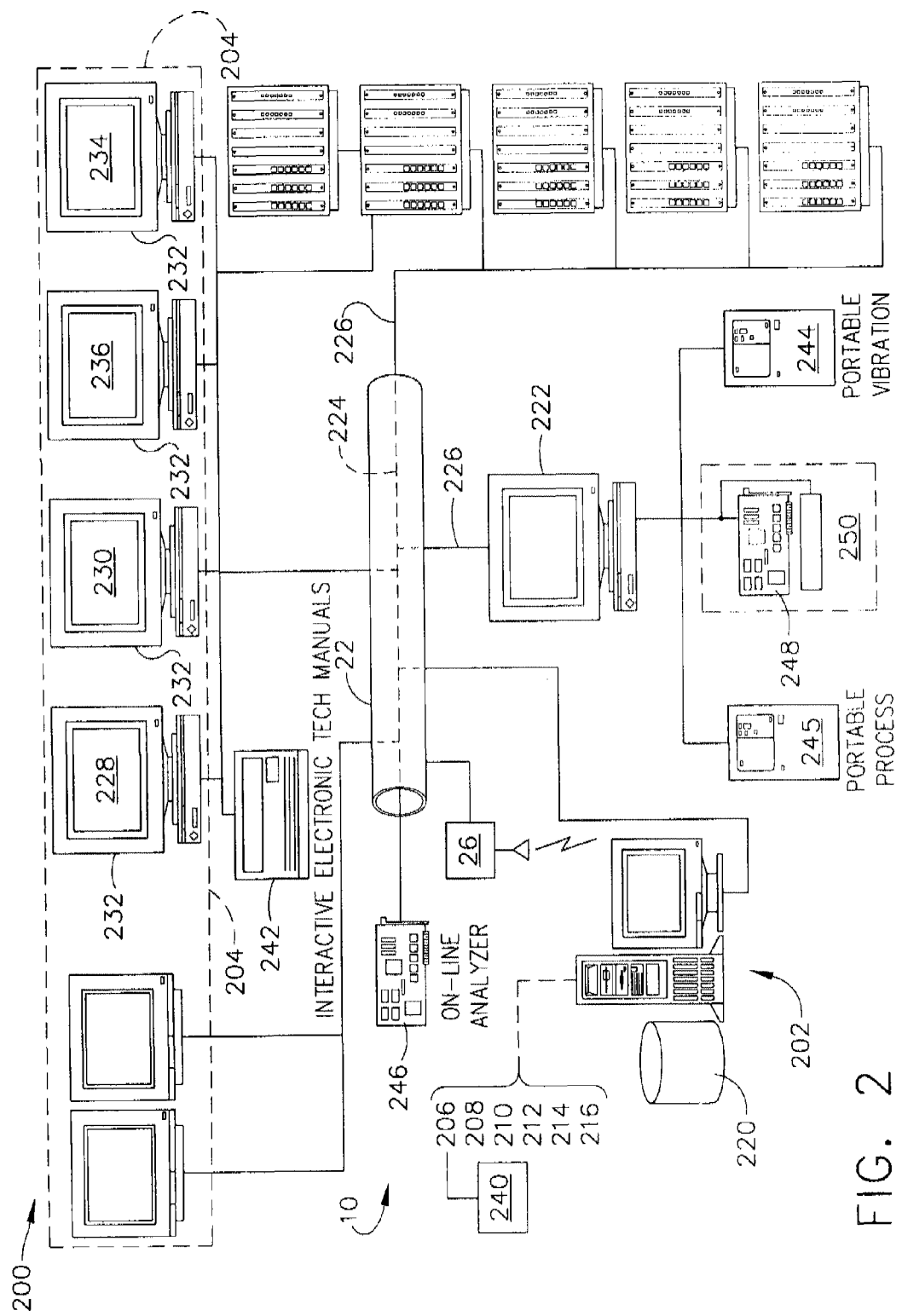
FIG. 2 is a block diagram of an exemplary embodiment of a network architecture of a plant control system implementing the continuous integrated machinery monitoring system (CIMMS) shown in FIG. 1.

FIG. 2 is a block diagram of an exemplary embodiment of a network architecture of a plant control system 200 implementing CIMMS 114 (shown in FIG. 1). Components in system 200, identical to components of system 10 (shown in FIG. 1), are identified in FIG. 2 using the same reference numerals as used in FIG. 1. In the exemplary embodiment, system 200 includes a server system 202 and client systems 204. Server system 202 further includes a database server 206, an application server 208, a web server 210 a fax server 212, a directory server 214, and a mail server 216. Each of servers 206, 208, 210, 212, 214, and 216 may be embodied in software executing on server system 202, or any combinations of servers 206, 208, 210, 212, 214, and 216 may be embodied alone or in combination on separate server systems coupled in a local area network (LAN) (not shown). A disk storage unit 220 is coupled to server system 202. In addition, a workstation 222, such as a system administrator's workstation, a user workstation, and/or a supervisor's workstation are coupled to a LAN 224. Alternatively, workstations 222 are coupled to LAN 224 using an Internet link 226 or are connected through an Intranet.

Each workstation 222 may be a personal computer having a web browser. Although the functions performed at the workstations typically are illustrated as being performed at respective workstations 222, such functions can be performed at one of many personal computers coupled to LAN 224. Workstations 222 are described as being associated with separate exemplary functions only to facilitate an understanding of the different types of functions that can be performed by individuals having access to LAN 224.

Server system 202 is configured to be communicatively coupled to various individuals, including employees 228 and to third parties, e.g., service providers 230. The communication in the exemplary embodiment is illustrated as being performed using the Internet, however, any other wide area network (WAN) type communication can be utilized in other embodiments, i.e., the systems and processes are not limited to being practiced using the Internet.

In the exemplary embodiment, any authorized individual having a workstation 232 can access CIMMS 114. At least one of the client systems may include a manager workstation 234 located at a remote location. Workstations 222 may be embodied on personal computers having a web browser. Also, workstations 222 are configured to communicate with server system 202. Furthermore, fax server 212 communicates with remotely located client systems, including a client system 236 using a telephone link (not shown). Fax server 212 is configured to communicate with other client systems 228, 230, and 234, as well.

Computerized modeling and analysis tools of CIMMS 114, as described below in more detail, are stored in server 202 and can be accessed by a requester at any one of client systems 204. In one embodiment, client systems 204 are computers including a web browser, such that server system 202 is accessible to client systems 204 using the Internet. Client systems 204 are interconnected to the Internet through many interfaces including a network, such as a local area network (LAN) or a wide area network (WAN), dial-in-connections, cable modems and special high-speed ISDN lines. Client systems 204 could be any device capable of interconnecting to the Internet including a web-based phone, personal digital assistant (PDA), or other web-based connectable equipment. Database server 206 is connected to a database 240 containing information about industrial plant 10, as described below in greater detail. In one embodiment, centralized database 240 is stored on server system 202 and can be accessed by potential users at one of client systems 204 by logging onto server system 202 through one of client systems 204. In an alternative embodiment, database 240 is stored remotely from server system 202 and may be non-centralized.

Other industrial plant systems may provide data that is accessible to server system 202 and/or client systems 204 through independent connections to LAN 224. An interactive electronic tech manual server 242 services requests for machine data relating to a configuration of each machine. Such data may include operational capabilities, such as pump curves, motor horsepower rating, insulation class, and frame size, design parameters, such as dimensions, number of rotor bars or impeller blades, and machinery maintenance history, such as field alterations to the machine, as-found and as-left alignment measurements, and repairs implemented on the machine that do not return the machine to its original design condition. Additionally, server system 202 may send predetermined and/or selectable setpoints to DCS 20. Such setpoint may be determined based on a predetermined limitation on an equipment combination to limit its capability based on a machinery history, as-found, and/or as left inspection results. Other rule determinations may also transmitted to DCS 20.

A portable vibration monitor 244 may be intermittently coupled to LAN directly or through a computer input port such as ports included in workstations 222 or client systems 204. Typically, vibration data is collected in a route, collecting data from a predetermined list of machines on a periodic basis, for example, monthly or other periodicity. Vibration data may also be collected in conjunction with troubleshooting, maintenance, and commissioning activities. Such data may provide a new baseline for algorithms of CIMMS 114. Process data may similarly, be collected on a route basis or during troubleshooting, maintenance, and commissioning activities. Certain process parameters may not be permanently instrumented and a portable process data collector 245 may be used to collect process parameter data that can be downloaded to plant control system 200 so that it is accessible to CIMMS 114. Other process parameter data, such as process fluid chemistry analyzers and pollution emission analyzers may be provided to plant control system 200 through a plurality of online monitors 246.

Electrical power supplied to various machines or generated by generators within industrial plant 10 may be monitored by a relay 248, for example, but, not limited to a protection relay, associated with each machine. Typically, such relays 248 are located remotely from the monitored equipment in a motor control center (MCC) or in switchgear 250 supplying the machine. In addition, to relay 248, switchgear 250 may also include a supervisory control and data acquisition system (SCADA) that provides CIMMS 114 with a condition of power supply or power delivery system (not shown) equipment located at the industrial plant 10, for example, in a switehyard, or remote transmission line breakers and line parameters.

Figure 3:
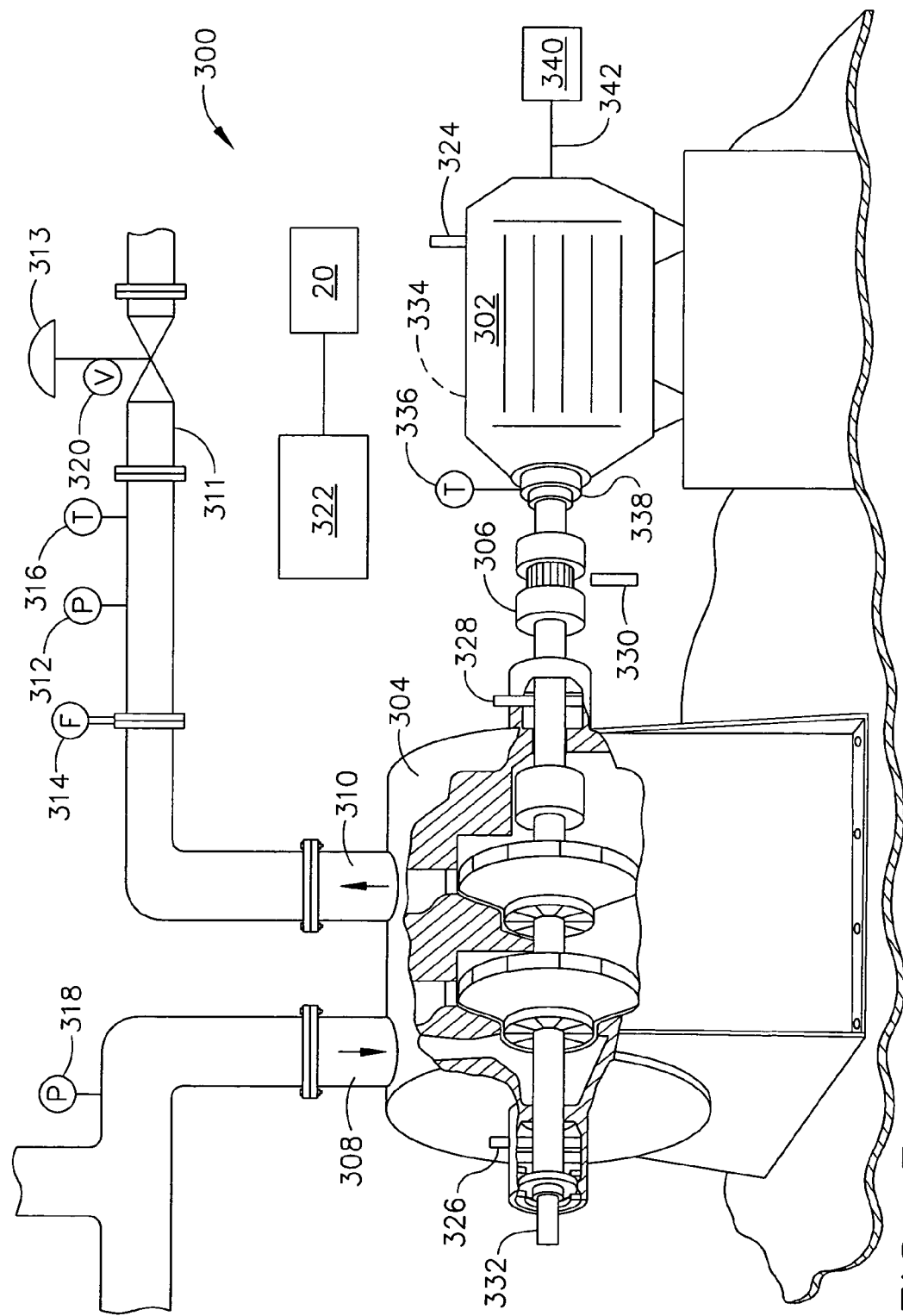
FIG. 3 is a perspective view of an exemplary motor/pump combination that may be one of a plurality driver/driven machine combinations analyzed by the CIMMS shown in FIG. 1.

FIG. 3 is a perspective view of an exemplary motor/pump combination 300 that may be one of a plurality driver/driven machine combinations analyzed by CIMMS 114. It should be understood that CIMMS 114 may be used to monitor and analyze rotating equipment including pumps, turbines, fans, blowers, compressors, non-rotating equipment, such as, transformers and catalytic reactors, or other types of equipment. A pump and motor combination is illustrated for purposes of example only. Pump and motor combination 300 includes motor 302 and a pump 304. Motor 302 may be an electric motor, diesel engine or turbine, or other power source. Motor 302 is operatively connected to pump 304 via coupling 306. Pump 304 includes an inlet 308 and an outlet 310. A control valve 311 may be located downstream from outlet 310 of pump 304. Control valve 311 may be responsive to commands received from DCS 20 for operating pump and motor combination 300 within selected operating design parameters. Control valve 311 is also used to control flow through pump 304 to satisfy piping and process system requirements. Closing control valve 311, by providing a signal to a valve operator 313, increases fluid resistance to flow and causes pump 304 to operate at a higher pressure and a lower flow rate. Similarly, opening control valve 311 results in reduced fluid resistance, increased flow rate and a relatively lower pressure.

A head tank (not shown) may be located upstream from inlet 308 of pump 304. The head tank may include a level sensor and may provide pump 304 with sufficient head pressure to facilitate avoiding a cavitation condition from occurring in pump 304. Process sensors may include an outlet pressure sensor 312, which is positioned proximate outlet 310 of pump 304, for determining pump outlet pressure. Process sensors may also include a flowmeter 314 for determining a flow rate of a process fluid downstream of pump 304, a temperature sensor 316, which is proximately positioned upstream or downstream of pump 304 for determining temperature of the process fluid, an inlet pressure sensor 318, which is positioned proximate pump inlet 308 for determining rotating machine inlet pressure, and a valve position sensor 320.

Valve position sensor 320 may be coupled to control valve 311 and communicate with an input/output (I/O) device 322 for converting electrical signals to digital signals, preprocessing sensor signals, and/or to transmit the signals to DCS 20 as raw data. Valve position sensor 320 is used to determine the position of control valve 311, and valve position sensor 320 may provide input for a confirmatory method for calculating flow through pump 304. Flow through valve 311 can be calculated from a position of control valve 311, a pressure drop across valve 311 and known fluid properties and pump geometry and/or a pump curve supplied with the pump 304. The fluid properties, pump geometry, and/or a pump curve may be stored in a database associated with CIMMS 114, such as, for example, on interactive electronic tech manual server 242. Flow through valve 311 may then be stored as original data. This information enables a baseline head versus flow performance reference curve to be developed in the absence of a pump curve supplied from the pump supplier, and provides an alternate method to confirm operation of sensors monitoring pump 304. For example, when flowmeter 314 fails, the failure may be isolated to flowmeter 314 rather than a failure of pump 304 or other component of combination 300.

Additional sensors that may be used include, but are not limited to, vibration sensors, which may be embodied in an accelerometer 324, other vibration sensors may be proximity sensors, such as a pump outboard proximity sensor 326, a pump inboard proximity sensor 328, a transducer a once-per-revolution event, such as a Keyphasor® 330, and a thrust sensor 332. Motor 302 may include a winding temperature sensor 334 for determining an overheating and or overload condition in motor 302, a bearing temperature sensor 336 to confirm an operating condition of a motor bearing 338. A current and voltage of the electrical energy supplied to motor 302 may be monitored locally or remotely at the MCC supplying motor 302, or may be monitored by relay 248.

A variable speed drive (VSD) 340 may be electrically coupled to motor 302 through a cable 342. VSD 340 may also be communicatively coupled to DCS 20 to receive commands to change a rotational speed of motor 302 to provide a selected flow and pressure.

Figure 4:
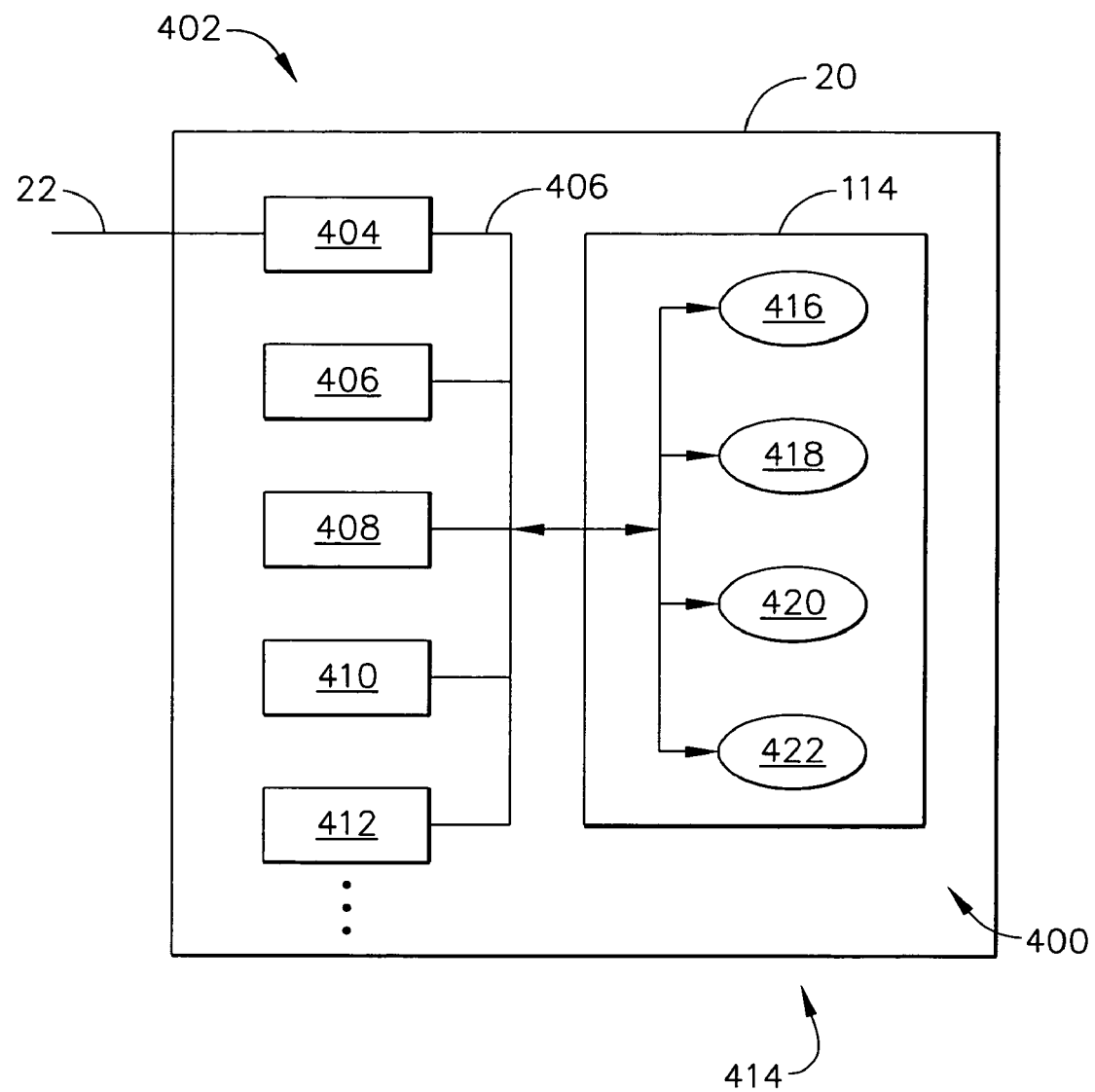
FIG. 4 is a block diagram of a data control structure that may be used with the DCS to implement an exemplary embodiment of the CIMMS shown in FIG. 1.

FIG. 4 is a block diagram of a data control structure 400 that may be used with DCS 20 to implement an exemplary embodiment of CIMMS 114 (shown in FIG. 1). DCS 20 may include CIMMS 114 executing on processor 24 within DCS 20. Alternatively, CIMMS 114 may operate separately form DCS 20 as a standalone processing platform, such as, a computer, workstation, and/or client system processing machine.

DCS 20 may include a plurality of hardware layers 402 that perform various functions within DCS 20. For example, a communications layer 404 may receive communications from a plurality of devices through network backbone 22. At least some devices are process monitoring devices such as, for example, outlet pressure sensor 312, flowmeter 314, temperature sensor 316, inlet pressure sensor 318, valve position sensor 320, input/output (I/O) device 322, accelerometer 324, pump outboard proximity sensor 326, pump inboard proximity sensor 328, keyphasor 330, thrust sensor 332, winding temperature sensor 334, and bearing temperature sensor 336. Additionally, sensors from other motor/pump combinations, driver/driven combinations, monitored electrical equipment, pollution control equipment, and environmental sensors associated with plant 10 may provide communications to DCS 20 through network backbone 22, or directly through dedicated inputs. Other distributed control systems and skid controllers may communicate with DCS 20 as well.

Data received by communications layer 404 may be pre-processed by communications layer 404 before being transmitted to data bus 406, and data being transmitted by communications layer 404 to network backbone 22 may be post processed as needed for compatibility with various protocols used by devices communicatively coupled to communications layer 404. DCS 20 may include a data processing layer 406 that is configured to receive data from data bus 406. Data processing layer 406 may compare received data values to predetermined limits, check for faulty instruments and sensors. DCS 20 may also include an archive layer 408 wherein data may be stored for later processing, trending, time-based analysis, and outputting to output devices in a user selectable format. A data analyzer layer 410 may be used to provide signal processing of data received through communications layer 404. Such signal processing may include, but is not limited to average, standard deviation, peak detection, correlation, fast fourier transform (FFT), and demodulation. Specific calculations may be mathematical algorithms, logical rule based, and/or soft computing that exploit the tolerance for imprecision, uncertainty and partial truth to achieve tractability, robustness and low solution cost, including, for example, fuzzy logic, and/or neural network processes involving multidimensional chains of calculations and decisions. The calculations may also include statistical analyses and database management processes. For some algorithms, calculations are performed on the input parameters directly. Some algorithms may use data transforms, that may be generated for a particular application, or use standard techniques, such as, for example, various types of signal analysis. Also, artificial intelligence based calculations may be used, such as, rule-based methods for diagnosis of specific conditions, and/or complex calculations based on neural networks that may be applied to complex pattern recognition in signal analysis.

Data analyzer layer 410 may be embodied in software executing in DCS 20, or a separate analyzer communicatively coupled to data bus 406. Data analyzer layer 410 may also be embodied in one or more hardware analyzers such as, circuit cards, application specific integrated circuits (ASIC), and/or analog or digital logic circuits.

CIMMS 114 may include a plurality of software layers 414 communicatively coupled to data bus 406. Software layers may include a derived quantity layer 416 that may use data available in the DCS hardware layers 402 to compute values for parameters that can not be measured directly because, for example, the parameter is not instrumented. For example, head loss remote from a point in a pipe that is instrumented may be computed based on known values of pressure, flow, fluid dynamics and piping characteristics. Each derived quantity may have differing levels of certainty from each other based on the amount of data available for computing that particular derived quantity, for example, a pressure sensor used to compute one derived quantity may have a larger or smaller accuracy compared to a pressure sensor used to compute another derived quantity. Derived quantity layer 416 may use a plurality of pressure sensors to compute a single derived quantity. Derived quantity layer 416 may determine the derived quantity using the pressure sensor that exhibits the greatest accuracy at the time of measurement. At a later time, under different operating conditions, derived quantity layer 416 may select a different pressure sensor to compute the derived quantity. Alternatively, derived quantity layer 416 may select both pressure sensors to compute the derived quantity, but may weight each pressure sensors contribution to the calculation based on an operating condition of the system. Derived quantity layer 416 may compute a derived quantity for any desired parameter in plant 10 that can be equated to one or more measured parameters within plant 10.

Derived quantity layer 416 may also compute confirmatory sets of data that relates to measured quantities in plant 10. For example, derived quantity layer 416 may use measured process parameters received from hardware layers 402 for comparison to values that are derived from other measured process parameters and/or other derived quantities to confirm operability and/or accuracy of sensors and/or data processing devices. For example, vibration data received from a pump may indicate a marked increase in one or more vibration parameters. Derived quantity layer 416 may use measured and/or derived quantities, such as, but, not limited to, pump flow, outlet pressure, motor current, and/or other industrial plant measured parameters to confirm the nature of the problem with the vibrating pump. Such an analysis occurs in real-time using measured quantities of the associated motor/pump combination, other system measured parameters, and/or derived quantities. Further analysis may be initiated to increase the data available for pump diagnosis and/or condition assessment. For example, derived quantity layer 416 may transmit the received vibration data to a vibration analyzer for further data extraction. The extracted data combined with the measured quantities of the associated motor/pump combination, the other system measured parameters, and/or the derived quantities may then be used to determine the pump condition.

A rule set layer 418 includes a predefined set of rules for each equipment combination 300 and each individual piece of equipment in industrial plant 10. Such rule sets may take data for a given scenario, for example, a motor/pump combination and automatically calculate and determine performance or faults based on given inputs. Rule sets are a grouping of rules based on domain knowledge that has been learned on the machinery and performs a set of calculations and analysis without the need for the domain knowledge expert.

A recommendation layer 420 monitors measured process parameters, derived quantities, signal processing algorithms, analyzer outputs, and accesses rule sets to determine trigger points for equipment conditions. The trigger points are used to initiate actions, such as, recommending additional data collection, for example from portable data collectors or equipment not integrated into the DCS 20 or CIMMS 114. Other actions may include recommending a mitigating procedure, such as a script of commands that, if selected, may initiate mitigating steps, such as, shutting down affected equipment, lining-up alternate flow paths, and starting up equipment combinations that are redundant to the affected equipment. Recommendation layer 420 may recommend a maintenance procedure that may initiate commands to place an affected equipment combination in a condition for performing maintenance activities on the equipment combination. Additionally, recommendation layer 420 may use interaction online technical manual to display design drawings and procedures to maintenance personnel during a maintenance procedure so that manually collecting data and inspection results may be updated immediately and be made immediately available to plant engineering and operations personnel. Recommendation layer 420 may use the entered manually collected data and inspection results to apply other rules from rule set layer 418 to make further recommendations. For example, a micrometer reading of a pump shaft dimension may indicate a critical parameter has been exceeded and that instead of a simple repair in the field, a shop rebuild is necessary to return the pump to an operable condition. Recommendation layer 420 may recommend an operating procedure as a result of evaluating measured process parameters, derived quantities, and the rules stored in rule set layer 418. The operating procedure may guide operating personnel through a series of steps that may prolong the life, mean time between failures, and/or extend operability to a next outage. Operating procedure may use rule set 418 to recommend alternate operating cycles, expanding operational limits to secondary limits, and postponing routine procedures that stress affected equipment.

A display layer 422 generates display output that may be transmitted to monitors, printers, data files, and/or other software modules for analysis and/or forwarding to a pager and/or e-mail client. Display layer 422 may format the display output according to user selectable inputs. Such displays may include, but are not limited to current values, a paragraph, a machine train diagram, an alarm/system event list, a trend/multivariable trend, a tabular list, a timebase, an orbit/timebase, orbit, a shaft average centerline, a spectrum/full spectrum, an x vs. y, waterfall/full waterfall, a polar/acceptance region, a bode, a cascade/full cascade, a reciprocating compressor plot, a rod position, a compressor map, a P-V diagram, a Log P versus Log V, a pressure versus crank angle, a polar, and a phasor plot.

Figure 5:
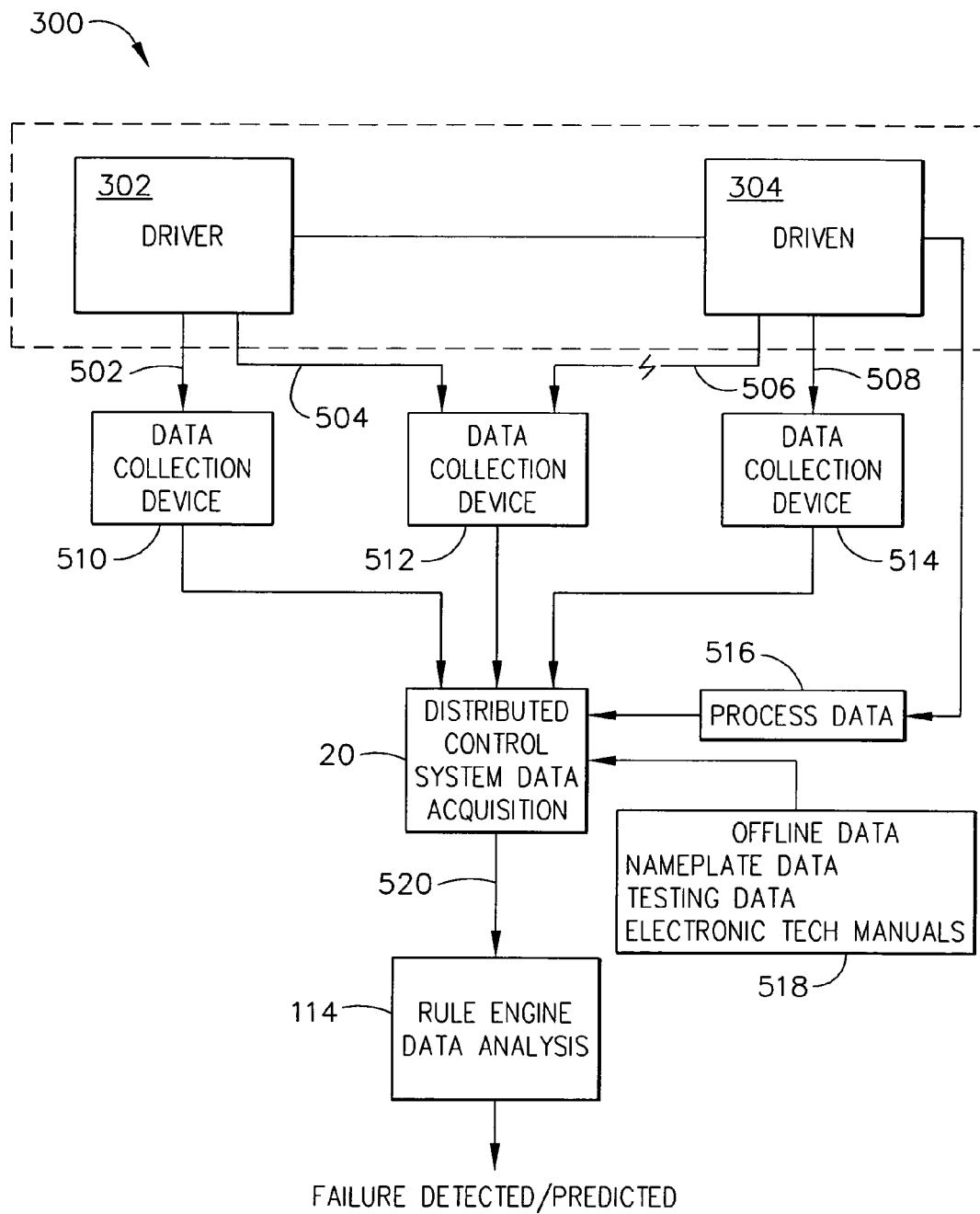
FIG. 5 is a data flow diagram of an exemplary data flow path for monitoring the equipment combination shown in FIG. 3.

FIG. 5 is a data flow diagram of an exemplary data flow path for monitoring an equipment combination 300 (shown in FIG. 3). Driver/driven combination 300 includes a driver machine, such as a turbine, engine, and/or motor 302, a driven machine, such as a generator, compressor, and/or pump 304. Motor 302 and pump 304 are typically coupled together, by their respective shafts, through a variable speed coupling, a gearbox, a belt and pulley arrangement, or other coupling device (shown in FIG. 3). Motor 302 and pump 304 may be monitored by a suite of process, environmental, and machine sensors (shown in FIG. 3). Outputs from these sensors may be transmitted via various data collection instruments through one or more data transmission conduits, for example, but not limited to, a fiber optic cable 502, a copper cable 504, such as a twisted pair cable, a wireless connection 506, and a digital network segment 508. One or more data collection devices 510, 512, and 514 receive signals from the sensors and may preprocess at least a portion of the signals before transmitting data representative of the sensor outputs to DCS 20. Process data from a plurality of locations in industrial plant 10 may be collected using a field input/output (I/O) cabinet 516 that may preprocess the process data before transmitting the process data to DCS 20. One or more databases may store offline data 518, for example, but not limited to, machine nameplate data, industrial plant and component design data, component maintenance history, including inspection results and temporary operating limitations, and other periodically updateable data that facilitates deriving operating parameters using measured parameters.

DCS 20 is provided with predetermined logic for receiving measured parameters from equipment located in industrial plant 10 or locally remotely but, associated with industrial plant 10, and developing control outputs to modify industrial plant equipment. A continuous integrated machinery monitoring system CIMMS 114 may communicate bi-directionally with DCS 20 over one or more network segments 520 or may be integral to DCS 20 and execute on processor 24. CIMMS 114 includes a database of rule sets that are configured to monitor industrial plant equipment using measured parameters and derived quantities based on measured parameters and offline data 518. The rule sets include rules that direct analysis of rule set inputs and place a result of the analysis on outputs of the rule set. Rule sets may include rules specific to a plant asset, such as a motor/pump combination, or may include rules specific to an industrial plant system, such as a cooling water system. Rule sets may be applied to more than one plant asset and operate to relate the output of the rule set to input parameters using one or more algorithms, signal processing techniques, and/or waveform analysis parameters. When applied to a specific plant asset, such as combination 300, the rules in the rule set use measured parameters and derived quantities for plant equipment and driver/driven combinations that may be fluidly communicating with combination 300 but arc located remotely. As such, the derived quantities associated with other plant equipment may be used to verify measured parameters associated with combination 300 and provide information about parameters associated with combination 300 that cannot be measured directly due to, for example an absence of a sensor capable of measuring the parameter or a sensor malfunction.

When a failure is detected and/or predicted, CIMMS 114 may provide input to DCS 20 to initiate automatic control action to mitigate the effects o the failure and/or may provide an operator with notification of the failure and may generate a recommendation for action to be taken by the operator.

A technical effect is to integrate monitoring and control functions and expert system analysis into a decision system that operates with a plurality of data sources for substituting derived quantities of process parameters to facilitate analyzing equipment combination health and verifying sensor health and accuracy. The integration allows rule sets to govern monitoring, control, analysis, and maintenance by producing recommendations based on continuously updated contemporaneous data to ensure the best decision can be made. The rule sets are updateable based on comparing actual findings in the field to recommended procedures.

While the present invention is described with reference to an industrial plant, numerous other applications are contemplated. It is contemplated that the present invention may be applied to any control system, including facilities, such as commercial facilities, vehicles, for example ships, aircraft, and trains, and office buildings or a campus of buildings, as well as, refineries and midstream liquids facilities, and facilities that produce discrete product outputs, such as, factories.

The above-described real-time equipment monitoring system is cost-effective and highly reliable system for monitoring and managing the operation and maintenance of facilities. More specifically, the methods and systems described herein facilitate determining facility machine health in real-time and recommending actions to correct or mitigate the effect of unhealthy or failed machines. As a result, the methods and systems described herein facilitate reducing operating costs in a cost-effective and reliable manner.

Exemplary embodiments of real-time equipment monitoring systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for operating a facility having a plurality of equipment combinations, each equipment combination is operable interactively with at least one other equipment combination, said method comprising:

receiving a plurality of measured process parameters, in real-time, for each of the plurality of equipment combinations, wherein the equipment combinations include at least a driver machine and a driven machine;

determining, using a computer, at least one derived quantity from at least one measured process parameter associated with at least a first of the equipment combinations and from at least one measured process parameter associated with at least a second of the equipment combinations, wherein the at least one derived quantity is associated with at least one of the plurality of equipment combinations and is compared to a measured process parameter to verify an operability of at least one sensor; and recommending a change to an equipment operation based on the measured process parameters and the at least one derived quantity.

2. A method in accordance with claim 1 wherein receiving a plurality of measured process parameters further comprises receiving measured process parameters intermittently.

3. A method in accordance with claim 1 wherein determining at least one derived quantity comprises determining at least one derived quantity in real-time.

4. A method in accordance with claim 1 wherein determining at least one derived quantity comprises:

receiving measured process parameters associated with each of the at least one derived quantity; and determining each of the at least one derived quantity using at least one rule from a rule set.

5. A method in accordance with claim 1 further comprising generating a rule set for an equipment combination using at least one of the measured process parameters, the at least one derived quantity, a design specification for the equipment combination, a maintenance history of the equipment combination, and an expert database.

6. A method in accordance with claim 1 further comprising receiving technical information from an online interactive technical manual for at least one equipment combination.

7. A method in accordance with claim 1 further comprising receiving measured process parameters from a remote input/output device.

8. A method in accordance with claim 1 further comprising receiving measured process parameters from a portable data logger.

* * * * *